(12) United States Patent
Cho (10) Patent No.: US 11,017,692 B2
(45) Date of Patent: May 25, 2021

(54) DEVICE OF EXTRACTING REGULARITY FOR A NUMBER SEQUENCE AND THE METHOD THEREOF

(71) Applicant: EQUALKEY CORP., Seoul (KR)

(72) Inventor: Bong Han Cho, Seoul (KR)

(73) Assignee: EQUALKEY CORP., Seoul (KR)

( * ) Notice: Subject to any disclaimer, the term of this patent is extended or adjusted under 35 U.S.C. 154(b) by 350 days.

(21) Appl. No.: 15/694,757

(22) Filed: Sep. 1, 2017

(65) Prior Publication Data

US 2018/0068587 A1     Mar. 8, 2018

(30) Foreign Application Priority Data

Sep. 2, 2016   (KR) .................. 10-2016-0113437

(51) Int. Cl.
    *G09B 19/02*     (2006.01)
    *G09B 5/06*      (2006.01)
    *G09B 1/00*      (2006.01)

(52) U.S. Cl.
    CPC ............. *G09B 19/025* (2013.01); *G09B 1/00* (2013.01); *G09B 5/065* (2013.01)

(58) Field of Classification Search
    CPC ........ G09B 19/02; G09B 19/00; G09B 23/04; G09B 19/025; G09B 5/065; G09B 1/00
    See application file for complete search history.

(56) References Cited

U.S. PATENT DOCUMENTS

| | | | |
|---|---|---|---|
| 3,131,488 A * | 5/1964 | Slater | G09B 19/02 434/195 |
| 4,332,567 A | 6/1982 | Nogues | |
| 6,575,756 B2 | 6/2003 | Sabin | |
| 7,914,287 B2 | 3/2011 | Nguyen | |
| 2001/0055747 A1* | 12/2001 | Sabin | G09B 19/02 434/208 |
| 2010/0003651 A1* | 1/2010 | Zilber | A63F 9/10 434/208 |
| 2010/0285437 A1* | 11/2010 | Radas | G09B 19/02 434/207 |

* cited by examiner

*Primary Examiner* — Jerry-Daryl Fletcher
(74) *Attorney, Agent, or Firm* — Loza & Loza, LLP; Thomas H. Ham (57) ABSTRACT

The present invention relates to a method of extracting regularity for an arbitrary number sequence and a device using the same, and especially provides a method and a device for finding regularity for an arbitrary number sequence using objects and computing the number that appears after a certain amount of time or times.

12 Claims, 7 Drawing Sheets

DEVICE OF EXTRACTING REGULARITY FOR A NUMBER SEQUENCE AND THE METHOD THEREOF

BACKGROUND

Numerous phenomena in nature can be represented by a set of numbers or a sequence of numbers. It is possible to simply express complex natural phenomena by discovering the regularity from the set or sequence of these numbers.

Today, many scientists use mathematical algorithms to model the phenomena of the natural world, thereby simplifying complex phenomena. As a result, many technological fields including communication and multimedia have been developed.

One of the most common problems that most people who are trying to express numerical representations of certain phenomena and interpret numerical meanings, including those who teach and want to learn mathematics, is that they focus on getting the answers quickly and easily to mathematical problems rather than understanding basic principles of numbers. Even those who professionally deal with numbers intend to solve the problems based on the mathematical formulas learned in the past.

Many people have difficulty of solving mathematical problems since they rely on their corresponding formulas only and can not find the fundamental solution principles.

The present invention is aimed at solving the difficulties of dealing with numbers, and suggests a more fundamental and analytical solution possible to obtain a desired regularity regardless of any number sequence and to find out what number appears after a certain amount of time or times thereto. It also allows users to have confidence in the solving process by intuitively recognizing and representing numbers.

A method to be proposed in the present invention is to use a cube mostly. The reason for using the cube is that the numbers can be three-dimensionally described by using cubes and thus more diverse arrangements can be obtained. But it is not limited to the use of cubes since objects or various figures can be applied.

Hereinafter, the prior arts of tools for teaching mathematics using objects including cubes or blocks will be described related to the present invention.

U.S. Pat. No. 4,332,567 (Jun. 1, 1982) relates to a mathematical teaching apparatus for arithmetic, metric and analytical geometry and elementary algebra. It is formed by a cubic block array comprising a plurality of different size blocks arranged in rows and columns. The cubic block array has a base array of ten-by-ten blocks commencing with a one centimeter block and progressing in x and y rows with increasing length blocks and overlying arrays of the same pattern but progressively increasing in height.

It relates to the present invention in that it uses cubes for teaching mathematics. However, since mathematical operation using the cubes in the prior art is different from that of the present invention, the prior art is a different invention from the purpose, structure and effect of the present invention.

More recently, U.S. Pat. No. 7,914,287 (Mar. 29, 2011) relates to a system and method for teaching and learning mathematics and the system comprises cubes, pegs, magnets, dividers, shafts, and a number placement panel. The shafts may comprise individual marks representing the base ten number system.

The invention presents a method of learning mathematics through a cognitively authentic learning experience in constructing and building numbers, but the technical features are different from finding regularity for an arbitrary number sequence presented in the present invention.

U.S. Pat. No. 6,575,756 (Jun. 10, 2003) relates to a mathematical teaching apparatus in which a set of blocks is used as an aid for teaching mathematical concepts, in which blocks of different sizes are provided with characteristic dimensions that bear a relationship to preselected numbers in the Fibonacci series. The blocks can be used to teach students mathematical concepts such as pattern recognition, the Fibonacci series and related Golden Ratio, and the interrelations between mathematics and other disciplines such as biology, botany, and architecture.

Although the prior art relates to the present invention in describing mathematical concepts for Fibonacci sequences using blocks, since the present invention uses objects (cubes) of the same size and finds regularity of a number sequence, the prior art is a different invention from the purpose, structure and effect of the present invention.

As described above, most prior art attempts to explain a mathematical concept using cubes and has different sizes of cubes. However, there is no prior art like the present invention which extracts a number in an arbitrary sequence after a certain amount time or times by finding regularity of the sequence using figures including cubes or objects.

So far, the way to find the general solution to the sequence has been solving a problem by memorizing a solving method or a result rather than suggesting a way to understand the basic principles of the sequence.

Accordingly, the present invention teaches a mathematical concept using a method of calculating the number after a certain amount of time or times for a specific input sequence of numbers by arranging objects (cubes) in one dimension and two dimensions. Also, it is aimed at applying it to solving problems of a specific application field by showing a certain phenomenon as an arrangement of numbers in that field and finding regularity thereon.

SUMMARY

It is an objective of the present invention to provide a method for finding regularity for an arbitrary sequence and compute the number being appeared after a certain amount of time or number of times using objects including cubes, blocks, shapes, figures, images or physical structures.

Another objective of the present invention is to provide a method of arranging objects for a given arbitrary sequence and recognizing dimensions from the arranged objects to find regularity for a various number of arrangements.

Another objective of the present invention is to predict regularity for an arbitrary sequence using objects to graphically output a process of finding the regularity of the sequence input and to allow the user to recognize the process, thereby to improve the understanding of the mathematical concept for the number.

It is another objective of the present invention for a user to deal with the given sequence and to understand the concept for himself by allowing the user to interactively recognize a process of extracting regularity for a sequence input using the objects, or to automatically recognize a process with a time delay.

It is another objective of the present invention to output a process of finding the regularity of the sequence input as an audible signal and to allow the user to recognize the process using the objects.

It is another objective of the present invention to intuitively learn the concept of factor decomposition, arithmetic operation, and size of a number through a method of finding regularity for any given sequence of numbers.

It is another objective of the present invention to provide a device, a learning tool, a computer program, a game tool, contents (video, audio, data or combination thereof: Ex) multimedia contents) and the like that implement a method of finding regularity for any given sequence of numbers.

According to a feature of the present invention to achieve the objectives described as above, a device of extracting regularity of a number sequence comprises: an object arrangement unit configured to arrange corresponding objects for the number sequence or rearranging the arranged objects; and a regularity extraction unit configured to extract regularity of the number sequence through the arrangement or the rearrangement; wherein a number that appears after a certain amount of time or times is recognized using the regularity.

The regularity extraction unit arranges vertical objects (k) to be all the same, records missing or remaining objects (a) separately after matching number of the first vertical objects and calculates number of the n-th object as k*n+a, in a case that a dimension recognized through the arrangement or the rearrangement is one-dimensional.

And the regularity extraction unit divides the objects in half so as to make a difference by two or stacks in two to extract a thickness (k) and cuts out a remainder so that the sequence be a pattern such as 1, 3, 5, 7, 9, . . . and calculates number of the n-th object as k*n^2, in a case that a dimension recognized through the arrangement or the rearrangement is two-dimensional.

The device of extracting regularity of a number sequence further comprises: a graphic output unit configured to graphically output a process of finding regularity of the sequence input through the object arrangement unit and the regularity extraction unit for a user to recognize the process. Wherein the user can interactively recognize a progress of the process of extracting regularity of the input sequence or automatically recognize the process with a time delay.

The device further comprises: an audible signal output unit configured to output a process of finding regularity of the sequence input through the object arrangement unit and the regularity extraction unit as an audible signal for the user to recognize the process.

The device of extracting regularity of a number sequence comprises: a math learning device, a game device, a content player, or a storage device storing a computer program or computer program source codes for executing the computer program.

The device of extracting regularity of a number sequence is made into a book, a toy or a teaching material containing a flat image, a stereoscopic image or an animation, by using any material including paper, wood, plastic, metal, or combinations thereof.

According to another feature of the present invention to achieve the objectives described as above, a method of extracting regularity of a number sequence comprises: arranging corresponding objects for the number sequence or rearranging the arranged objects; and extracting regularity of the number sequence through the arrangement or the rearrangement; wherein a number that appears after a certain amount of time or times is recognized using the regularity.

Wherein extracting regularity arranges vertical objects (k) to be all the same, records missing or remaining objects (a) separately after matching number of the first vertical objects and calculate number of the n-th object as k*n+a, in a case that a dimension recognized through the arrangement or the rearrangement is one-dimensional. And extracting regularity divides the objects in half so as to make a difference by two or stacks in two to extract a thickness (k) and cuts out a remainder so that the sequence be a pattern such as 1, 3, 5, 7, 9, . . . and calculates a number of the n-th object as $k*n^2$, in a case that a dimension recognized through the arrangement or the rearrangement is two-dimensional.

The method further comprises: graphically outputting a process of finding regularity of the sequence input through the arranging objects and the extracting regularity for a user to recognize the process. Wherein, the user can interactively recognize a progress of the process of extracting regularity of the input sequence or automatically recognize the process with a time delay.

The method further comprises: outputting a process of finding regularity of the sequence input through arranging objects and extracting regularity as an audible signal for the user to recognize the process.

The method of extracting regularity of a number sequence is operated by a math learning device, a game device, a content player, or a storage device storing a computer program or computer program source codes for executing the computer program.

The method of extracting regularity of a number sequence is made into a book, a toy or a teaching material containing a flat image, a stereoscopic image or an animation using any material including paper, wood, plastic, metal, or combinations thereof.

According to the above features of the present invention, it is possible to understand a concept of an arbitrary number sequence by finding regularity for the sequence of numbers and easily computing the number that appears after a certain amount of time or times in the sequence using objects. It helps anyone to solve problems in a specific application field by finding regularity for a sequence of numbers and provides a device, a learning tool, a computer program, a game tool or contents that implements a method of the present invention for a number sequence to allow anyone to get familiar with number. It is also useful in solving problems by finding a concept of and regularity for a number sequence.

BRIEF DESCRIPTION OF THE DRAWINGS

For more complete understanding of this disclosure, reference is now made to the following brief description, taken in connection with the accompanying drawings and

DETAILED DESCRIPTION

DETAILED DESCRIPTION

Hereinafter, preferred embodiments of the present invention will be described in detail with reference to the accompanying drawings. Like reference symbols in the drawings denote like elements. Also, specific structural and functional descriptions for embodiments of the present invention are presented for purposes of describing embodiments of the present invention only, and unless otherwise defined, all terms used herein, including technical or scientific terms have the same meaning as commonly understood by those of ordinary skill in the art to which the present invention belongs.

In the present invention, an object (cube) is used to extract regularity of a sequence of numbers and the cube is preferably a regular hexahedron. Basically, cubes having the same size are arranged to derive regularity. However, in order to find regularity, the cubes can be divided at a certain rate such as ½ or ¼. However, the basic shape used for the arrangement of the cubes for an arbitrary sequence is preferably a regular hexahedron. In the case where a multi-dimensional array is further required, it is possible to divide the cubes at a predetermined ratio. On the other hand, finding regularity of a number sequence using an object of the present invention does not necessarily require the use of cubes. Therefore, a figure having a certain shape or an object belongs to the scope of the present invention if it can be arranged in a geometrical manner according to the method of the present invention to induce regularity.

Also, the technical scope of the present invention may apply to a book, a toy, or a teaching material containing a flat image, a stereoscopic image or an animation made of any material including paper, wood, plastic, metal or a combination thereof according to the method of the invention. It should be understood that a product simply modified by those skilled in the art is also within the scope of the present invention.

In addition, the object used in the present invention may be any object or figure including a cube, a sphere, an arbitrary shape and a block.

Figure 1:
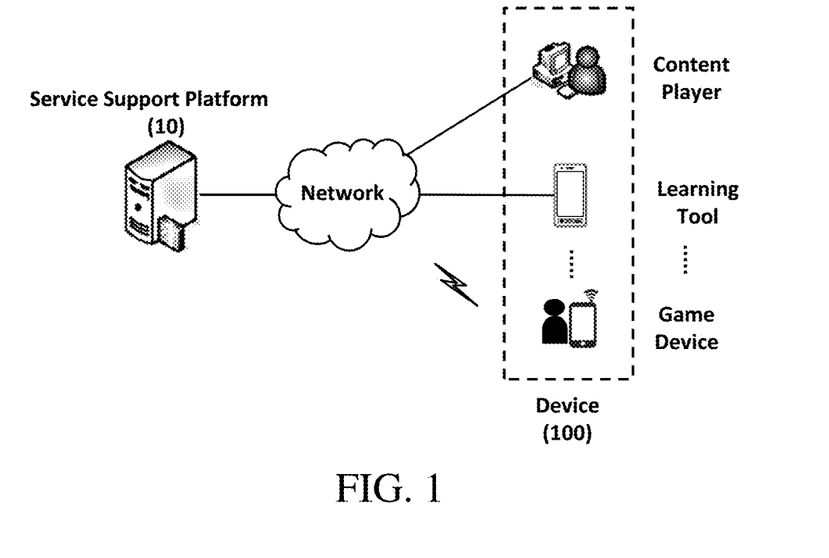
FIG. 1 is an exemplary diagram illustrating an example in which various devices for extracting regularity of a sequence of numbers using objects (cubes) according to an embodiment of the present invention and a platform for providing services to the device are connected to a communication network to provide a service.

FIG. 1 is an exemplary diagram illustrating an example in which various devices for extracting regularity of a sequence of numbers using objects (cubes) according to an embodiment of the present invention and a platform for providing services to the device are connected to a communication network to provide a service.

As shown in FIG. 1, a cube device (100) for extracting regularity of a sequence of numbers using objects according to an exemplary embodiment of the present invention may include various devices including a game device, a content player, a learning tool. The above-mentioned cube device installs and executes a cube program in a general-purpose computer or a terminal, so that the general-purpose computer or terminal becomes a cube device.

In other words, the service provider implements a technology for extracting regularity of a sequence of numbers using objects (cubes) through a service support platform 10 as a core program, and uses it to create various application programs (game contents, contents, lecture contents) and supplies the user with the program, which the user can download and use. Devices that can download or stream application can be mobile phones, tablets, PCs, laptop computers, televisions, dedicated learning tools or memories (USB, SSD memory, etc.). The device can execute the program that can find regularity of a sequence of numbers through the application by executing the downloaded or streamed application.

The service support platform 10 according to the present invention can generate and provide various games, contents, and learning programs to which a technique of extracting regularity of numbers is applied by using objects (cubes). It is also possible to adjust the difficulty level according to the user's age and level in various versions, or to instruct the learning or game by keeping the result of the process of learning or playing the game by the user.

Here, the game can provide a variety of numbers, including providing a learning as a game, and it is also possible to provide a quiz form to extract a specific sequence number or a post-sequential result of the sequence, and to perform a game through a character.

In addition, the contents according to the present invention may include various contents such as learning contents, game contents, or problem-solving contents using a technique of extracting regularity of numbers using objects (cubes).

In addition, the service support platform 10 provides an operating environment for various kinds of devices consumed by a user, and also includes an update for various games or learning contents provided by a service provider and maintains user information and etc.

Each cube device includes a user interface 130 including a wired/wireless communication interface (or network interface), a speaker, a microphone, a display, and the like and a memory (e.g., HDD, SSD, USB, etc.) inside or outside the cube device.

Meanwhile, the present invention can be applied to a device for extracting regularity of a number sequence by using objects (cubes) is made into a book, a toy, or a teaching material containing a flat image, a stereoscopic image or an animation using any material including paper, wood, plastic, metal, or combinations thereof. Therefore, in the present invention, the term device may be various types of products manufactured as described above.

The object (cube) of the present invention can be made of various materials, and it is possible to make a book using a manufactured object (cube), a toy, a teaching material, or an experiential apparatus for applying the regularity according to the present invention to real life. And all of these processes can be made into images. The image includes a plane image and a stereoscopic image, and these images can be reproduced in an animation form.

Hereinafter, a structure of a device for providing various kinds of contents to various kinds of devices and a detailed structure thereof will be described by using a method of extracting regularity for a sequence of numbers using objects (cubes).

Figure 2:
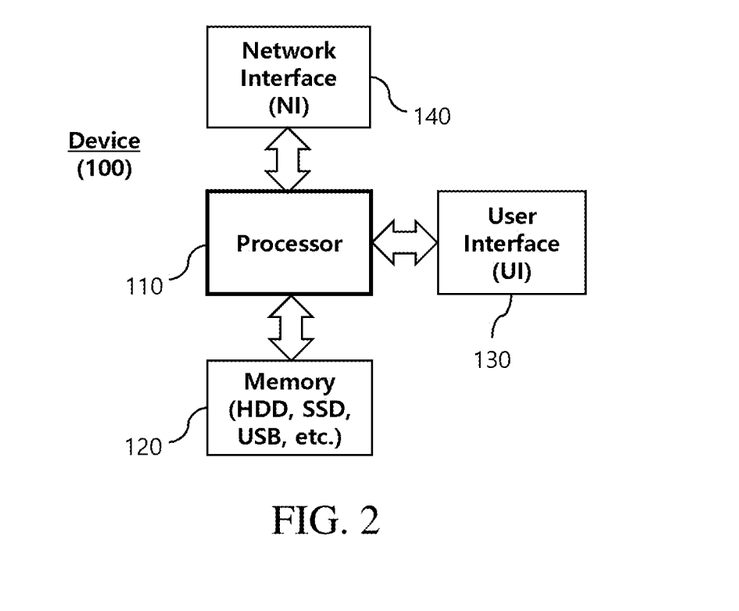
FIG. 2 is a block diagram illustrating a configuration of a cube device for extracting regularity of a sequence of numbers using objects (cubes) according to an embodiment of the present invention.

FIG. 2 is a block diagram illustrating a configuration of a cube device for extracting regularity of a sequence of numbers using objects (cubes) according to an embodiment of the present invention.

As shown in FIG. 2, a device 100 for extracting regularity using objects (cubes) according to the present invention includes a processor 110, a memory 120, a user interface (UI) 130, and a network interface (NI) 140.

The memory 120 may include information on a program for a process of finding regularity by using objects (cubes), the rule information, the graphic information, the sound information and the object (cube) information necessary for the processor 110 to operate.

The processor is a term that is mainly used when the device of the present invention is in the form of an electronic device. But if the method of the present invention is realized using a book, a toy, an experiential apparatus, a flat image, a stereoscopic image, an animation or a teaching material containing a flat image, a stereoscopic image or an animation, it should be considered that it contains the above processor.

And if a method of extracting regularity for an arbitrary sequence according to the present invention is implemented in the device, it should be recognized that it also includes technical features for the object arrangement unit 111 and the regularity extraction unit 113 in the processor of the present invention.

In addition, in the embodiment of the present invention, various information that can be perceived by humans can be provided for the process of finding the regularity of a sequence of numbers by using objects (cubes). The information includes text, video (image), alphabets, sounds (including voice, music, etc.), pulse signals, tactile signals, stimulus signals, and the like. These signals allow the human to recognize the process of finding the regularity of the numerical sequence using objects (cubes) in visual, tactile, auditory sense and perception and the information is output singly or in a combined form of plural information.

The user interface 130 also serves as an interface for receiving a specific input (e.g., a sequence of numbers) from a user or providing a variety of display results using objects (cubes). That is, a user can input information on a sequence of numbers by various methods such as voice, touch, input using a touch pad or keyboard and code. The output can also be graphically output to the display, or output as text, symbols, audible or tactile signals. In the present invention, an input method and an output method are not limited to those listed above. That is, there is no limitation on the input method or means, the output means, or the method.

As a result, the process of extracting regularity of a sequence of numbers according to the present invention can be transmitted using the brain waves so that the user can recognize them naturally.

In addition, the network interface 140 provides a means for the cube device 100 to operate by being connected to the network and receiving services remotely and to communicate with each other among the cube devices. It also makes it possible to update the contents of the service through the platform. Also, the network interface includes a wired and wireless communication interface and a combination thereof is also possible.

Next, the method of extracting regularity of a sequence of numbers using objects (cubes) of the present invention is executed in the processor 110 and the corresponding program can be stored in the memory 120.

Hereinafter, a method of extracting regularity of a sequence of numbers using objects (cubes) in the processor will be described in detail.

Figure 3:
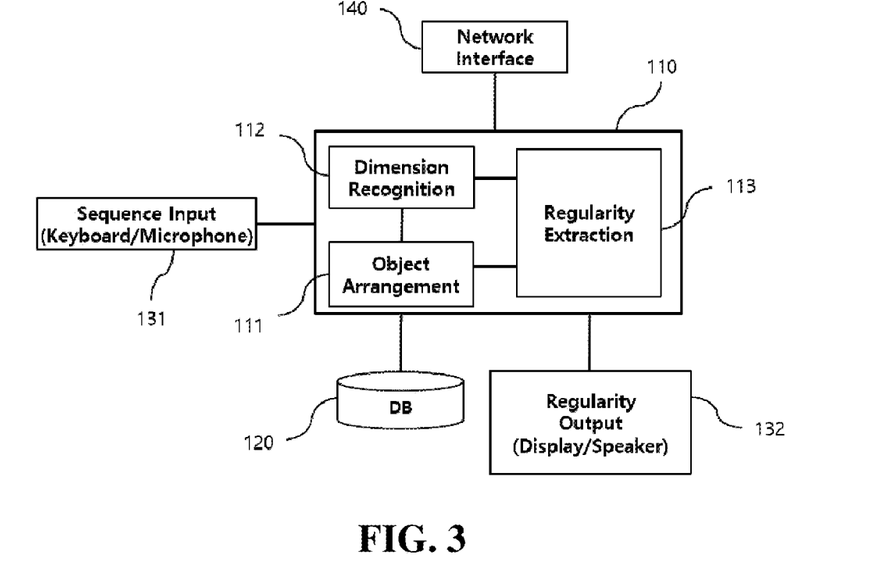
FIG. 3 is a block diagram illustrating a detailed configuration of a processor in a device for extracting regularity of a sequence of numbers using objects (cubes) according to an exemplary embodiment of the present invention.

FIG. 3 is a block diagram illustrating a detailed configuration of a processor in a device for extracting regularity of a sequence of numbers using objects (cubes) according to an exemplary embodiment of the present invention.

As shown in FIG. 3, a processor 110 of a device for extracting regularity for a sequence of numbers using objects (cubes) according to the present invention includes an object (cube) arrangement unit 111, a dimension recognition unit 112, a regularity extraction unit 113. In addition, the processor according to an embodiment of the present invention may accept a sequence directly from a user through a network interface 141, a database 120, a sequence input unit 131 or a regularity output unit 132 or receive input through the network. And it is also possible to output the process of extracting the regularity or the result of the extraction through the display. It is also possible to perform input or output through a microphone or a speaker. This has been specifically described above.

Here, the processor 110 may further include an input signal converter (not shown) for receiving various inputs and converting the received signals into signals suitable for use in the device in addition to the object arrangement unit 111, the dimension recognition unit 112 and the regularity extraction unit 113. And it may further include an output signal converting unit (not shown) for converting the output into a form selected in advance for graphics, sound, text, and the like and outputting it. And it may further include a storage interface unit (not shown) for storing the data in DB 120.

Hereinafter, a process of arranging the input sequence of numbers, recognizing the dimension and extracting the regularity will be described with reference to the following drawings.

Figure 4A:
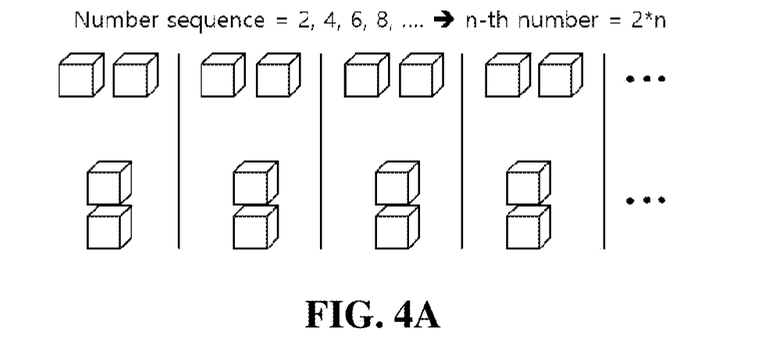
FIG. 4A to 4C illustrate a process of extracting regularity of a sequence of numbers in a case of one dimension by arranging and rearranging objects (cubes) according to an embodiment of the present invention.
Figure 4B:
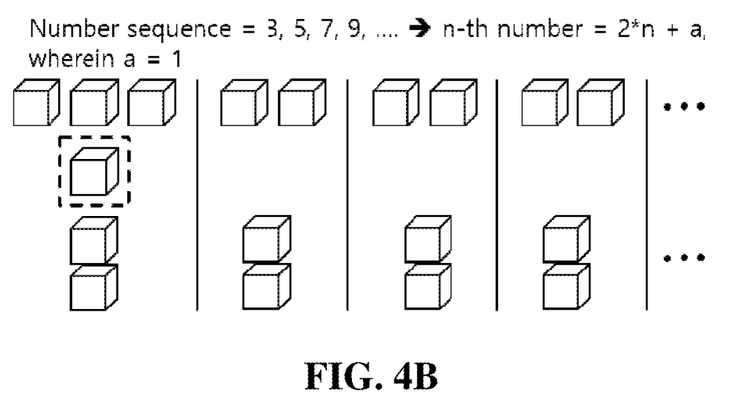
Figure 4C:
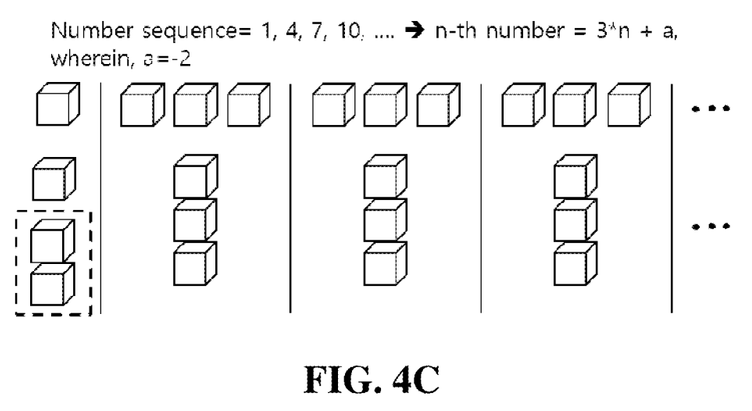

FIG. 4A to 4C illustrate a process of extracting regularity of a sequence of numbers in a case of one dimension by arranging and rearranging objects (cubes) according to an embodiment of the present invention.

Here, the case where the sequence of numbers is 1) 2, 4, 6, 8, . . . and 2) 3, 5, 7, 9, . . . are described first with the following example (refer to FIGS. 4A and 4B).

First, the object arrangement unit 111 arranges, rearranges, or combines objects (cubes) corresponding to the number of numbers for the arbitrary numbers input through the sequence input unit 131.

Here, a sequence for arbitrary numbers is the sequence such as simply 1, 3, 5, 7, . . . 2, 4, 6, 8, . . . . According to this sequence, the objects (cubes) are arranged in a horizontal direction by the number of the first number and then, the objects (cubes) corresponding to the sum of the first number and the next number are arranged in the horizontal direction. In this way, the objects (cubes) are arranged repeatedly enough to grasp the overall pattern of the sequence. (Three to six times may be sufficient).

It is easy to judge the increase of the number by vertically rearranging the objects (cubes) arranged in the horizontal direction as the corresponding number. Of course, they may be arranged in the vertical direction at one time.

Next, the dimension recognition unit 112 analyzes a pattern of a sequence of numbers according to the number of objects (cubes) arranged in the vertical direction, recognizes it as a one-dimensional sequence if the objects (cubes) are increased or decreased identically and recognizes it as a multi-dimensional sequence if the objects (cubes) are increased or decreased differently.

If the sequence recognized in this manner is one-dimensional, the regularity extraction unit 113 performs the following operations.

That is, if the sequence is 1) 2, 4, 6, 8, . . . , the n-th outgoing number is 2*n and if the sequence is 2) 3, 5, 7, 9, . . . , the n-th outgoing number is 2*n+1. In other words, if the sequence of numbers is 2, 4, 6, 8, . . . , the number of objects (cubes) to be incremented is 2 and it is simple that the n-th output is 2*n. If the sequence is 3, 5, 7, 9 . . . , the number that appears at the beginning is 3, so if 2 is set to the initial value, 1 is left. The number remaining or missing from the initial value is separately recorded and that value is added to the result. That is, it becomes 2*n+1. Of course, in the case of 1, 3, 5, 7, 9, . . . the n-th number becomes 2*n−1.

In general, 1) if the sequence of numbers is 1, 2, 4, 6, . . . , the n-th outgoing number is k*n (where k is the number of objects (cubes) to be incremented or decreased), 2) if it is 3, 5, 7, 9, . . . , it becomes k*n+a (where k is the number of objects (cubes) to be incremented or decreased, and a is the number of objects (cubes) missing or remaining. If there are no missing or remaining objects (cubes) from (k*n+a) cubes, it becomes k*n.

Therefore, if the number sequence is one-dimensional and is 1, 4, 7, 10, . . . , the numbers are increased by 3, and since there is one object (cube) in the beginning and not enough 2 objects (cubes) compared to increasing by 3, the n-th outgoing number is 3*n−2 (see FIG. 4C).

If the number array is 1, 4, 9, 16, . . . , the number increases or decreases by 1, 3, 5, 7, etc. and does not increase by the same size of number. In this case, it is necessary to determine the sequence as two-dimensional and extract the regularity of it.

In conclusion, the present invention extracts the regularity of the numbers according to the dimension recognized from the arranged objects (cubes), and recognizes the number that appears after a certain amount of time or times from the regularity.

When the recognized dimension is one-dimensional in particular, the objects (cubes) are arranged to be the same vertically and the number of the first objects (cubes) is matched, and then the objects (cubes) (a) are separately recorded in the case where there are objects (cubes) or no objects (cubes) missing or remaining. The number of n-th cube is calculated from the result. (=k*n+a). Here, if a=0, the number of all the vertically arranged objects (cubes) are the same. If a is positive (a>0), it means that the number of the first objects (cubes) is larger than the number of objects (cubes) increased or decreased. If a is negative (a<0), the number of the first objects (cubes) is smaller than the number of objects (cubes) increased or decreased.

If the number of objects (cubes) to be increased or decreased is not constant and increases more and more when the dimension recognition unit 112 analyzes the pattern of the sequence of numbers, it is required to recognize it as a multidimension and extract regularity accordingly.

Hereinafter, the operation of the regularity extraction unit 113 for extracting the regularity in the case where the sequence is multidimensional will be described.

Figure 5A:
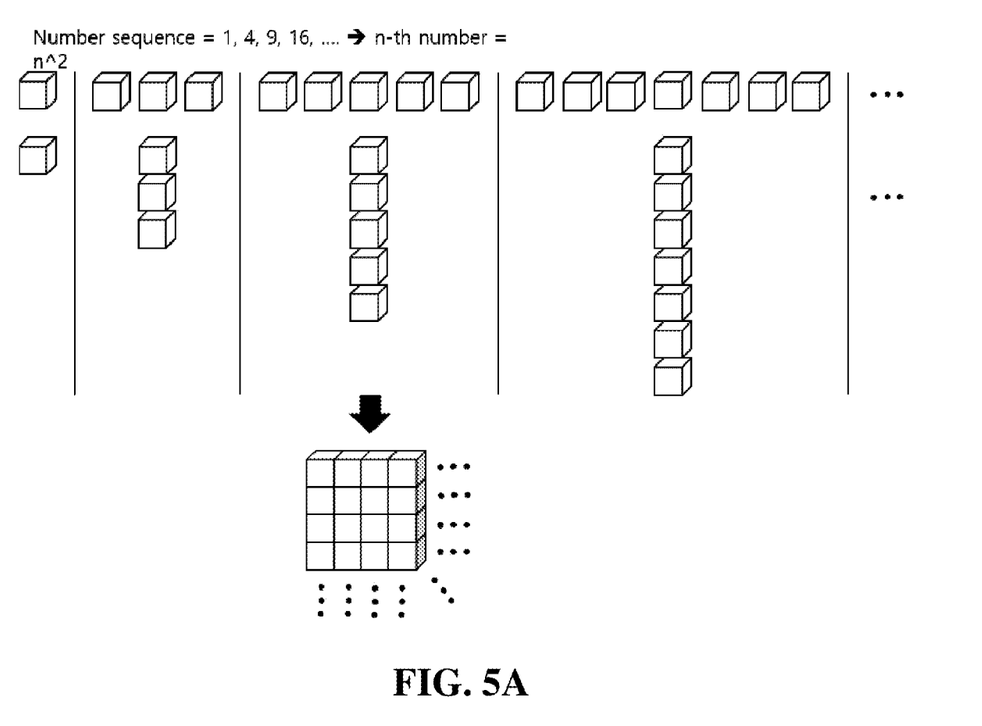
FIGS. 5A and 5B illustrate a process of extracting regularity in two dimensions by arranging and rearranging objects (cubes) according to an embodiment of the present invention.
Figure 5B:
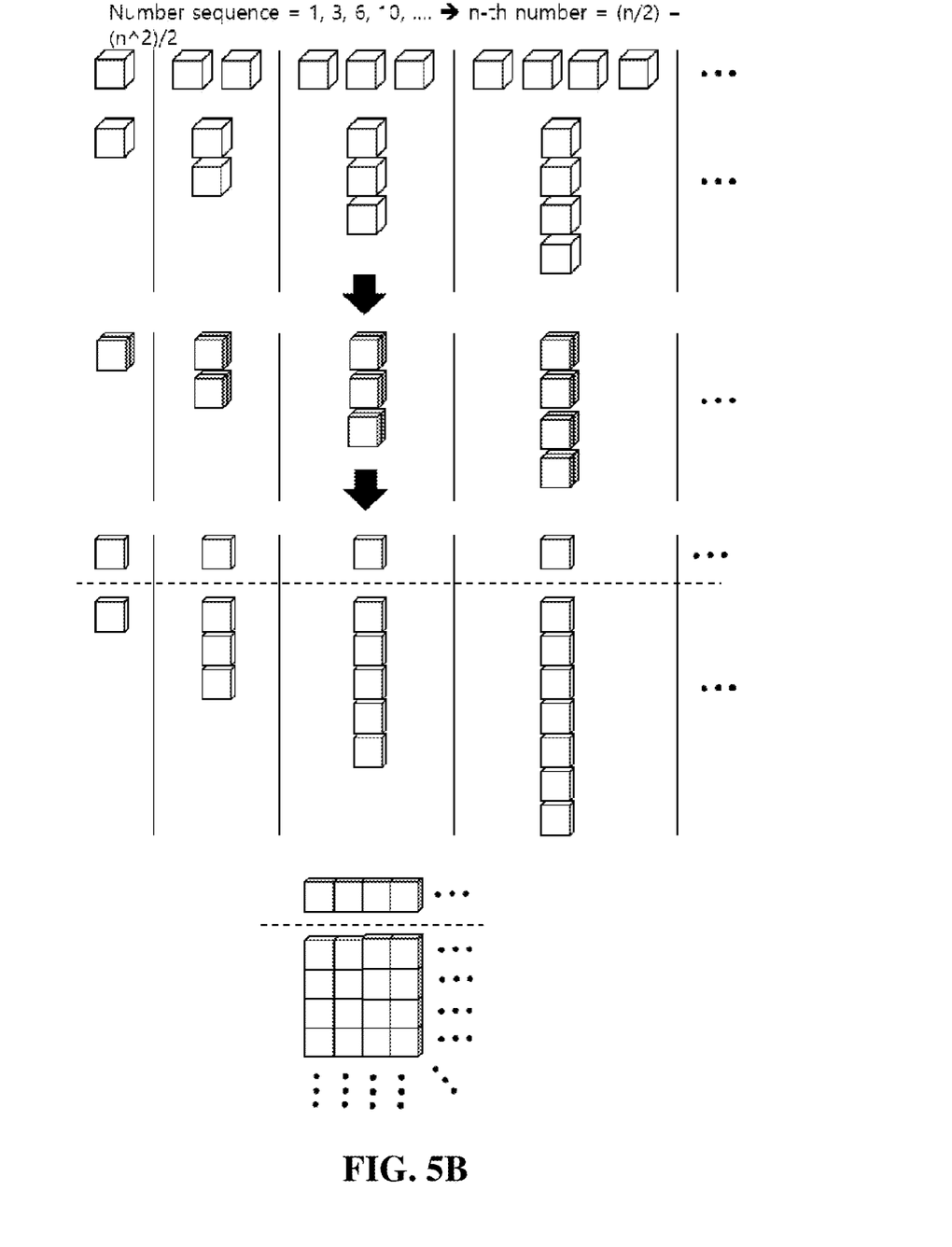

FIGS. 5A and 5B illustrate a process of extracting regularity in two dimensions by arranging and rearranging objects (cubes) according to an embodiment of the present invention. Here, the case where the sequence is 1) 1, 4, 9, 16, . . . , and 2) 1, 3, 6, 10 . . . will be described as examples.

In the case of 1, 4, 9, 16, . . . , since the increase or decrease of the number of rearranged results is 1, 3, 5, 7, . . . , if the number of the object (cube) is initially 1, it is 1. If three (3) are increased here, the increased three surround the one object (cube). In case of 5 more objects (cubes), one more surround makes a 2×2 object (cube) surrounded by three objects (cubes) a 3×3 object (cube). In this way, 7 more objects (cubes) make a 4×4 object (cube). For this sequence, we can see that the n-th number is the square of n (=n^2).

In the case of FIG. 5B in which the sequence of numbers is 1, 3, 6, 10, . . . , the sequence of numbers is rearranged vertically and the increment becomes 1, 2, 3, 4, . . . . In this case, the (½) objects (cubes) are arranged as 2, 4, 6, 8, . . . , if the objects (cubes) are divided into halves and arranged vertically without overlapping. Here again one half object (cube) is excluded from each increase or decrease and the number of n-th object (cube) is calculated with the other half objects (cubes). That is, n*(½) objects (cubes) are excluded in advance and an array of half objects (cubes) of 1, 3, 5, 7, . . . can be obtained. Therefore, the n-th number is (n/2)+(n^2)/2 objects (cubes).

Figure 6:
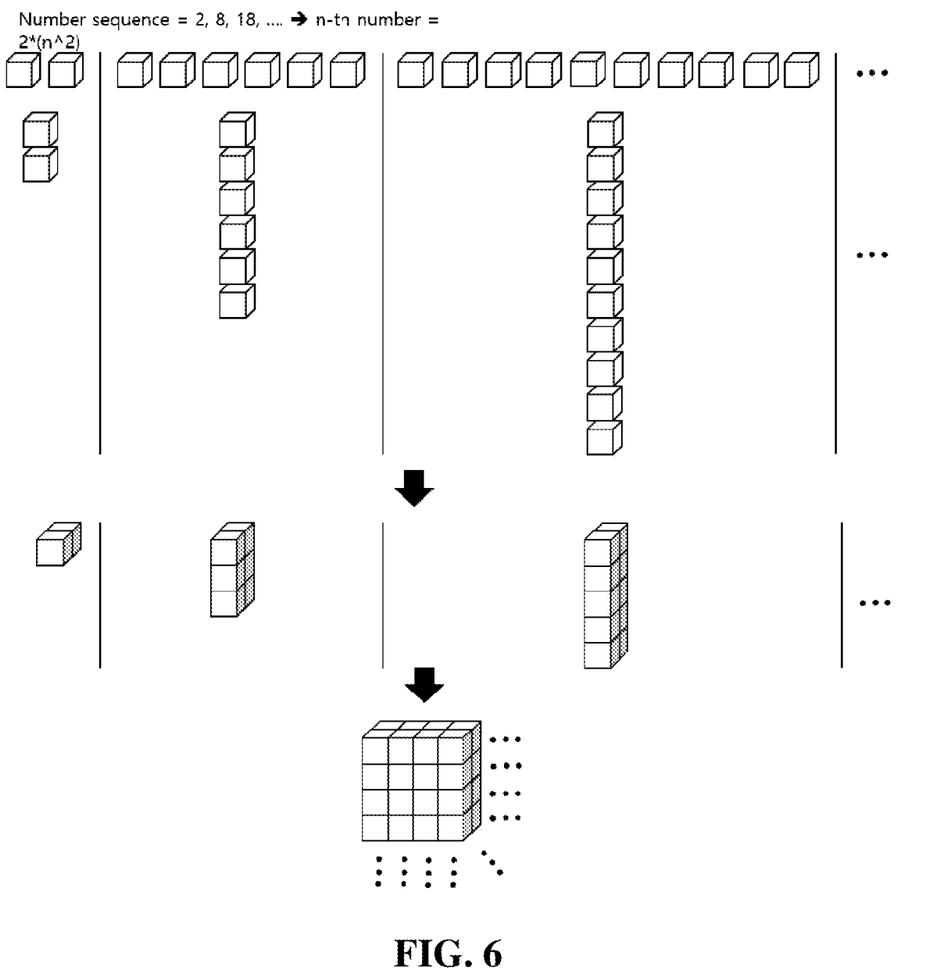
FIG. 6 is a diagram for explaining a process of extracting regularity in three dimensions by arranging and rearranging objects (cubes) according to an embodiment of the present invention.

Next, a three-dimensional case will be described as an example.

FIG. 6 is a diagram for explaining a process of extracting regularity in three dimensions by arranging and rearranging objects (cubes) according to an embodiment of the present invention. For example, it is exemplified for the number sequence, 2, 8, 18, . . . .

In this case, once the sequence is rearranged, the number of objects (cubes) increases by 2, 6, 10, . . . . When they are rearranged in pairs, they are arranged in pairs of 1, 3, 5, 7, . . . . This can be arranged in a square in pairs, so the n-th number is 2*(n^2). Here, it is k=2 when the two objects (cubes) are combined in pair, and a generalized expression is described as k*(n^2).

In other words, when the recognized dimension is two-dimensional, the objects (cubes) are arranged in the form of 1, 3, 5, 7, 9, . . . and the objects (cubes) are divided in halves so as to make a difference by two or stacked in two to extract the thickness (k). The number of n-th cubes (=k*n^2) can be calculated by cutting out the remainder so that the sequence has a pattern such as 1, 3, 5, 7.

From this regularity, it is possible to recognize, predict or calculate the number after a certain amount of time or times.

Figure 7:
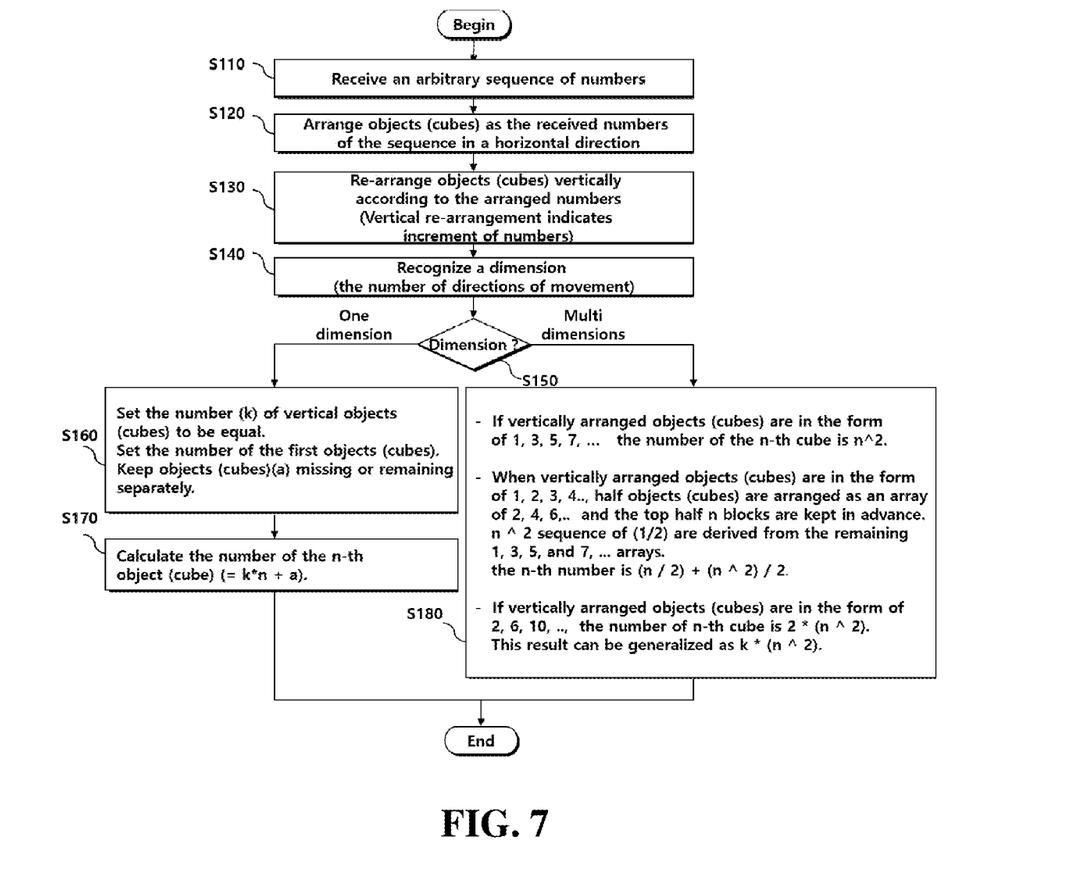
FIG. 7 is a flowchart illustrating a method of extracting regularity of a sequence of numbers using objects (cubes) according to an embodiment of the present invention.

A method of finding the regularity of an arbitrary sequence by describing the calculation method as a flowchart will be described as follows.

FIG. 7 is a flowchart illustrating a method of extracting regularity of a sequence of numbers using objects (cubes) according to an embodiment of the present invention.

As shown in FIG. 7, the arbitrary sequence of numbers is received through the sequence input unit 131 (S110). Here, as described above, the sequence input unit 131 may receive a sequence of numbers in various ways such as image, text, and voice.

Next, objects (cubes) as the sequence of numbers are arranged in the horizontal direction (S120). The object (cube) is rearranged vertically according to the arranged numbers (S130). This process is performed through the object arrangement unit 111 and is a process of arranging objects (cubes) for any given arranged numbers. This process further includes rearranging vertically in addition to arranging horizontally the objects (cubes) corresponding to the input sequence, it is easy to see how much the corresponding sequence increases through rearrangement.

Then, the dimension is recognized from the arranged objects (cubes) (S140). According to the dimension of the input sequence of numbers (S150), if the dimension is one-dimensional, the regularity is extracted through the processes of S160 and S170, and the n-th emerging number is recognized, predicted or calculated.

That is, in the case of one dimension, the number of vertically rearranged objects (cubes) is set to be equal to k, and if the number of the first objects (cubes) is not k, the number of the objects (cubes) is set to k first and count the number of missing or remaining and record it separately as a. (S160). Next, when the number of the n-th object (cube) is calculated, k*n+a is obtained (S170).

Next, the case where the dimension determined at S150 is a multidimensional higher than one dimension will be described. In the case of the one-dimensional case, if vertically arranged objects (cubes) are in the form of 1, 3, 5, 7, ... the number of the n-th object (cube) is n^2. Also, when vertically arranged objects (cubes) are arranged in the form of 1, 2, 3, 4, ..., half objects (cubes) are arranged as an array like 2, 4, 6, ..., and the top half n blocks are kept in advance. The n^2 sequence of (½) are derived from the remaining 1, 3, 5, and 7, ... arrays. Therefore, the n-th number is (n/2)+(n^2)/2.

On the other hand, if vertically arranged objects (cubes) are 2, 6, 10, ..., the number of n-th object (cube) is 2*(n^2). Therefore, generalizing these results is described as k*(n^2) (S180).

On the other hand, extracting regularity for an arbitrary sequence using objects (cubes) can graphically output a process of inputting and arranging a sequence of numbers, recognizing a dimension, and extracting regularity in the various forms such as text, image (image), number, alphabet, sound (including voice and music), pulse, tactile and stimulus signal. These signals allow the human to recognize the process of finding the regularity of the numerical sequence through the objects (cubes) by using visual, tactile, auditory sense and perception, and single or plural information in combination may be provided to humans.

Also, it is possible to allow the user to interactively recognize the progress of the process of extracting the regularity of the input sequence using the objects (cubes) or to automatically recognize the process with a time delay. This process means that a variety of expression methods can be used when a regularity extraction method for a sequence of numbers according to the present invention is specifically made to an application program.

That is, the present invention may output a process of finding the regularity of the sequence input as an audible signal and allow the user to recognize the process. In addition, it is also possible to output the tactile sense or perception. Outputting the extraction process can be performed through visual, tactile, auditory, perception, or a combination thereof, and does not limit the specific method.

In the present invention, it goes without saying that the technique of extracting the regularity of numbers using objects (cubes) can be operated by a mathematical learning device, a game device, a content player, a storage device storing computer program or source codes for executing a computer program.

As described above, the present invention relates to a method of finding regularity of an arbitrary sequence by using objects (cubes). By using objects (cubes), it is possible to find out the regularity of an arbitrary sequence and easily calculate the number of the sequence after a certain amount of time or times in the sequence and understand the concept of number arrangement. In addition, it is possible to easily find the regularity of the sequence in a specific application field, thereby helping solve the problem of the field. The present invention allows anyone to get familiar with numbers by providing a device, a learning tool, a computer program, a game tool, a content that implements a method of finding regularity of a sequence of numbers and to solve problems easily by finding the concept and the arrangement and order of the numbers.

While the present invention has been particularly shown and described with reference to exemplary embodiments thereof, it is to be understood that the invention is not limited to the disclosed exemplary embodiments. Each component of the present invention may be changed or modified within the technical scope of the present invention to achieve the same objectives and effects.

While the present invention has been particularly shown and described with reference to exemplary embodiments thereof, it is clearly understood that the same is by way of illustration and example only and is not to be taken in conjunction with the present invention. It will be understood that various changes and modifications may be made by those skilled in the art without departing from the spirit and scope of the present invention.

What is claimed is:

1. A device of representing regularity of a sequence of numbers to teach a user mathematics, the device comprising:
    a plurality of objects arranged for the numbers in the sequence,
    wherein the first number in the sequence is represented by one or more first objects in the plurality of objects and any increase from a previous number in the sequence is represented by the increment of the number of objects in the plurality of objects,
    wherein the objects are represented with at least one of cubes, spheres, blocks, or combinations thereof,
    wherein a pattern of the increment of the number of objects in the sequence represents regularity, a number to be appeared after certain numbers of times is represented by using the regularity, and
    wherein the increment of the number of objects (k) to be all the same, and missing or remaining objects (a) to be represented separately after matching the one or more first objects to the increment of the number of objects, and an n-th number in the sequence is represented as (k*n+a), in case that a dimension recognized through the arrangement is one-dimensional.

2. The device of claim 1, wherein the device of representing regularity of the sequence of numbers is one of a math learning device, a game device, or a content player.

3. The device of claim 1, wherein the device of representing regularity of the sequence of numbers is made into a book, a toy or a teaching material containing a flat image, a stereoscopic image or an animation, by using any material including paper, wood, plastic, metal, or combinations thereof.

4. A device of representing regularity of a sequence of numbers to teach a user mathematics, the device comprising:
    a plurality of objects arranged for the numbers in the sequence,
    wherein the first number in the sequence is represented by one or more first objects in the plurality of objects and any increase from a previous number in the sequence is represented by the increment of the number of objects in the plurality of objects,
    wherein the objects are represented with at least one of cubes, spheres, blocks, or combinations thereof,
    wherein a pattern of the increment of the number of objects in the sequence represents regularity, a number to be appeared after certain numbers of times is represented by using the regularity, and
    wherein the objects are divided in half or stacked in two folds, so that the objects are rearranged with increases by two objects in the sequence with a thickness (k) of the half objects (k=½) or the stacked objects (k=2), respectively, and result in a multiple (k) of a square ($n^2$), and missing or remaining objects (a) after matching the square, and thus an n-th number in the sequence is represented as ($k*n^2$)+a, in case that a dimension recognized through the arrangement is two-dimensional.

5. The device of claim 4, wherein the device of representing regularity of the sequence of numbers is one of a math learning device, a game device, or a content player.

6. The device of claim 4, wherein the device of representing regularity of the sequence of numbers is made into a book, a toy or a teaching material containing a flat image, a stereoscopic image or an animation, by using any material including paper, wood, plastic, metal, or combinations thereof.

7. A method of representing regularity of a sequence of numbers to teach a user mathematics, the method comprising:
arranging a plurality of objects for the numbers in the sequence, wherein the first number in the sequence is represented by one or more first objects in the plurality of objects and any increase from a previous number in the sequence is represented by the increment of the number of objects in the plurality of objects, wherein the objects are represented with at least one of cubes, spheres, blocks, or combinations thereof; and
representing regularity with a pattern of the increment of the number of objects in the sequence, a number to be appeared after certain numbers of times by using the regularity,
wherein the increment of the number of objects (k) to be all the same, and missing or remaining objects (a) to be represented separately after matching the one or more first objects to the increment of the number of objects, and an n-th number in the sequence is represented as ($k*n+a$), in case that a dimension recognized through the arrangement is one-dimensional.

8. The method of claim 7, wherein the method of representing regularity of the sequence of numbers is operated by one of a math learning device, a game device, or a content player.

9. The method of claim 7, wherein the method of representing regularity of the sequence of numbers is realized on a book, a toy or a teaching material containing a flat image, a stereoscopic image or an animation using any material including paper, wood, plastic, metal, or combinations thereof.

10. A method of representing regularity of a sequence of numbers to teach a user mathematics, the method comprising:
arranging a plurality of objects for the numbers in the sequence, wherein the first number in the sequence is represented by one or more first objects in the plurality of objects and any increases from a previous number in the sequence is represented by the increment of the number of objects in the plurality of objects, wherein the objects are represented with at least one of cubes, spheres, blocks, or combinations thereof; and
representing regularity with a pattern of the increment of the number of objects in the sequence, a number to be appeared after certain numbers of times by using the regularity,
wherein the objects are divided in half or stacked in two folds, so that the objects are rearranged with increases by two objects in the sequence with a thickness (k) of the half objects ($k=\frac{1}{2}$) or the stacked objects ($k=2$), respectively, and result in a multiple (k) of a square ($n^2$), and missing or remaining objects (a) are represented after matching the square, and an n-th number in the sequence is represented as ($k*n^2$)+a, in case that a dimension recognized through the arrangement is two-dimensional.

11. The method of claim 10, wherein the method of representing regularity of the sequence of numbers is operated by one of a math learning device, a game device, or a content player.

12. The method of claim 10, wherein the method of representing regularity of the sequence of numbers is realized on a book, a toy or a teaching material containing a flat image, a stereoscopic image or an animation using any material including paper, wood, plastic, metal, or combinations thereof.

* * * * *